(12) United States Patent
Katagiri et al.

(10) Patent No.: US 8,081,396 B2
(45) Date of Patent: Dec. 20, 2011

(54) PROCESSING DATA RECORDED ON A TAPE MEDIUM

(75) Inventors: Takashi Katagiri, Yamato (JP); Yutaka Oishi, Yamato (JP)

(73) Assignee: International Business Machines Corporation, Armonk, NY (US)

(*) Notice: Subject to any disclaimer, the term of this patent is extended or adjusted under 35 U.S.C. 154(b) by 133 days.

(21) Appl. No.: 12/538,220

(22) Filed: Aug. 10, 2009

(65) Prior Publication Data

US 2010/0053801 A1 Mar. 4, 2010

(30) Foreign Application Priority Data

Aug. 28, 2008 (JP) ................. 2008-219803

(51) Int. Cl.
*G11B 5/09* (2006.01)
*G11B 5/584* (2006.01)

(52) U.S. Cl. .................. 360/53; 360/48; 360/77.12

(58) Field of Classification Search .............. None
See application file for complete search history.

(56) References Cited

U.S. PATENT DOCUMENTS

| 6,429,984 B1 * | 8/2002 | Alex ......................... 360/31 |
| 7,545,713 B2 * | 6/2009 | Yamashiro ............ 369/47.4 |

FOREIGN PATENT DOCUMENTS

| JP | 2001067601 A | 3/2001 |
| JP | 2005092993 A | 4/2005 |

* cited by examiner

*Primary Examiner* — Daniell L Negron
(74) *Attorney, Agent, or Firm* — Cynthia G. Seal; Adam M. Steadman

(57) ABSTRACT

A device for processing data recorded on a tape medium includes a first control part that controls a read head to read specific data recorded in a first area among data recorded in a first format on the tape medium. Data in the first format is recorded at a first recording density. The device further includes a second control part that controls a write head to write the specific data in a second area different from the first area of the tape medium and to write the specific data in a second format in a third area different from the second area of the tape medium. Data in the second format is recorded at a second recording density different from the first recording density. Moreover, the device may include a recording part for recording specific information that specifies a read position of other data among data recorded in the first format on the tape medium.

21 Claims, 8 Drawing Sheets

| Tape format \ Tape drive | First generation | | Second generation | | Third generation | |
|---|---|---|---|---|---|---|
| | Read | Write | Read | Write | Read | Write |
| First generation (300 GB) | Y | Y | Y | Y | Y | N |
| Second generation (500 GB) | N | N | Y | Y | Y | Y |
| Third generation (640 GB) | N | N | N | N | Y | Y |

Figure 3

PROCESSING DATA RECORDED ON A TAPE MEDIUM

RELATED APPLICATION

This application claims priority under 35 U.S.C. §119 to Japanese Patent Application No. 2008-219803 filed Aug. 28, 2008, the entire text of which is specifically incorporated by reference herein.

FIELD OF THE INVENTION

The various embodiments described herein relate to a device and method for processing data recorded on a tape medium. More specifically, the various embodiments relate to a device and method for converting the format of data recorded on a tape medium and for reading the data without the risk of data loss.

BACKGROUND ART

A tape medium such as a magnetic tape can record a large amount of data at relatively low expense. Since the read and write speed of a tape medium is slower than the read and write speed of a hard disk, a tape medium is often used to preserve data stored in the hard disk for an extended time.

In recent years, the recording density of a tape medium has increased, and thus more data can be recorded. To improve recording density, data recorded at low recording density on a tape medium may be rewritten at high recording density. In Japan Published Unexamined Patent Application No. 2001-067601, a determination is made whether rewriting is possible to realize a desired recording density, and what recording frequency, tape speed, and write current should be set for such rewriting by referring to a table for a combination of the tape type and the recording density. If such rewriting is possible, the recording frequency, tape speed, and write current are set for such rewriting. In Japan Published Unexamined Patent Application No. 2005-092993, highly compressed moving picture data at a relatively higher compression ratio is generated from primarily compressed moving picture data at a given compression ratio and is sequentially recorded in a free area or over the primarily compressed moving picture data of the recording media.

As indicated above, a technique for rewriting data recorded at low recording density on a tape medium at high recording density has conventionally existed. However, errors that may occur during such rewriting are not addressed in the aforementioned applications. Accordingly, in the aforementioned applications, data may be lost if an error occurs when data recorded at low recording density is rewritten at high recording density. In fact, in the context of known art, this issue potentially may arise when converting data format in any scenario.

SUMMARY OF THE INVENTION

It is an object of the various embodiments described herein to convert the format of data already recorded on the tape medium so that data can be read without the risk of data loss if an error occurs. To accomplish such object, the various embodiments provide a device for processing data recorded on a tape medium. The device comprises a first control part for controlling a read head to read specific data recorded in a first area among data recorded in a first format on the tape medium. Data in the first format is recorded at a first recording density. Furthermore, the device comprises a second control part for controlling a write head to write the specific data in a second area of the tape medium different from the first area of the tape medium and to write the specific data in a second format in a third area different from the second area of the tape medium. Data in the second format is recorded at a second recording density different from the first recording density.

In accordance with an exemplary embodiment, the device further may comprise a recording part for recording specific information that specifies a read position of other data among data recorded in the first area in the first format on the tape medium. In this case, the first control part may control the read head to read the specific data written in the second format in the third area and to read the other data from the read position specified by the specific information if the other data cannot be read from the area following the third area. Also, the recording part may record the specific information together with the specific data in the third area.

In accordance with another exemplary embodiment, the device further may comprise a recording part for recording first specific information that specifies a part among the specific data written in the second area corresponding to a part of the specific data written in the second format in the third area, and further configured for recording second specific information that specifies a read position of other data among data recorded in the first format on the tape medium. In such case, the first control part further may control the read head to read a first part of the specific data written in the second format in the third area and to read a part among the specific data written in the second area that corresponds to a second part adjacent to the first part and that is specified by the first specific information, if the second part cannot be read from the third area. Additionally, the first control part further may control the read head to read the other data from the read position specified by the second specific information if the other data has yet to be read.

In addition, the first control part further may decide a volume of the specific data based on a capacity of a buffer for accumulating data that the read head reads. Alternatively, the first control part further may determine a volume of the specific data based on a volume of data that can be written in the second area.

Additionally, the second control part further may control the write head to write the specific data in the third area after writing the specific data in the second area.

Moreover, the various embodiments provide another device for processing data recorded on a tape medium. The device comprises a read head for reading data from the tape medium, a write head for writing data on the tape medium, and a controller for controlling the read head to read specific data recorded in a first area among data recorded in a first format on the tape medium, and controlling the write head to write the specific data in a second area different from the first area of the tape medium and to write the specific data in a second format in a third area different from the second area of the tape medium.

In addition, the various embodiments provide another device for processing data recorded on a tape medium. The device comprises a first control part for controlling a read head to read specific data recorded in a first area among data recorded in a first format on the tape medium. Moreover, the device comprises a generation part for generating first specific information that specifies a part among the specific data written in a second area different from the first area corresponding to a part of the specific data written in a second format in a third area different from the second area. The generation part generates second specific information that specifies a read position of other data among data recorded in the first format on the tape medium. Furthermore, the device comprises a second control part for controlling a write head to write the specific data and the first specific information in the second area of the tape medium and to write the specific data, the first specific information, and the second specific information in the second format in the third area of the tape medium.

Furthermore, the various embodiments provide a method for processing data recorded on a tape medium. The method comprises reading specific data recorded in a first area among data recorded in a first format on the tape medium. Data in the first format is recorded at a first recording density. The method further comprises writing the specific data in a second area of the tape medium different from the first area of the tape medium. The method further comprises writing the specific data in a second format in a third area different from the second area of the tape medium. Data in the second format is recorded at a second recording density different from the first recording density.

In accordance with an exemplary embodiment, the method further may comprise recording specific information that specifies a read position of other data among data recorded in the first area in the first format on the tape medium. In such case, the method further may comprise reading the specific data written in the second format in the third area and reading the other data from the read position specified by the specific information if the other data cannot be read from the area following the third area. The method further may comprise recording the specific information together with the specific data in the third area.

In accordance with another exemplary embodiment, the method further may comprise recording first specific information that specifies a part among the specific data written in the second area corresponding to a part of the specific data written in the second format in the third area and recording second specific information that specifies a read position of other data among data recorded in the first format on the tape medium. In such case, the method further may comprise reading a first part of the specific data written in the second format in the third area and reading a part among the specific data written in the second area that corresponds to a second part adjacent to the first part and that is specified by the first specific information, if the second part cannot be read from the third area. Moreover, the method further may comprise reading the other data from the read position specified by the second specific information if the other data has yet to be read.

In addition, the method further may comprise determining a volume of the specific data based on a capacity of a buffer for accumulating data that the read head reads. Alternatively, the method further may comprise determining a volume of the specific data based on a volume of data that can be written in the second area.

Additionally, the method further may comprise writing the specific data in the third area after writing the specific data in the second area.

In accordance with the various embodiments described herein, data can be read without the risk of being lost, even if an error occurs when converting the format of data already recorded on the tape medium.

BRIEF DESCRIPTION OF THE DRAWINGS

The various embodiments described herein will be described in detail with reference to the following figures, wherein:

FIG. 3 is a table showing read/write relationships between tape drive generations and tape format generations;

DETAILED DESCRIPTION

Figure 1:
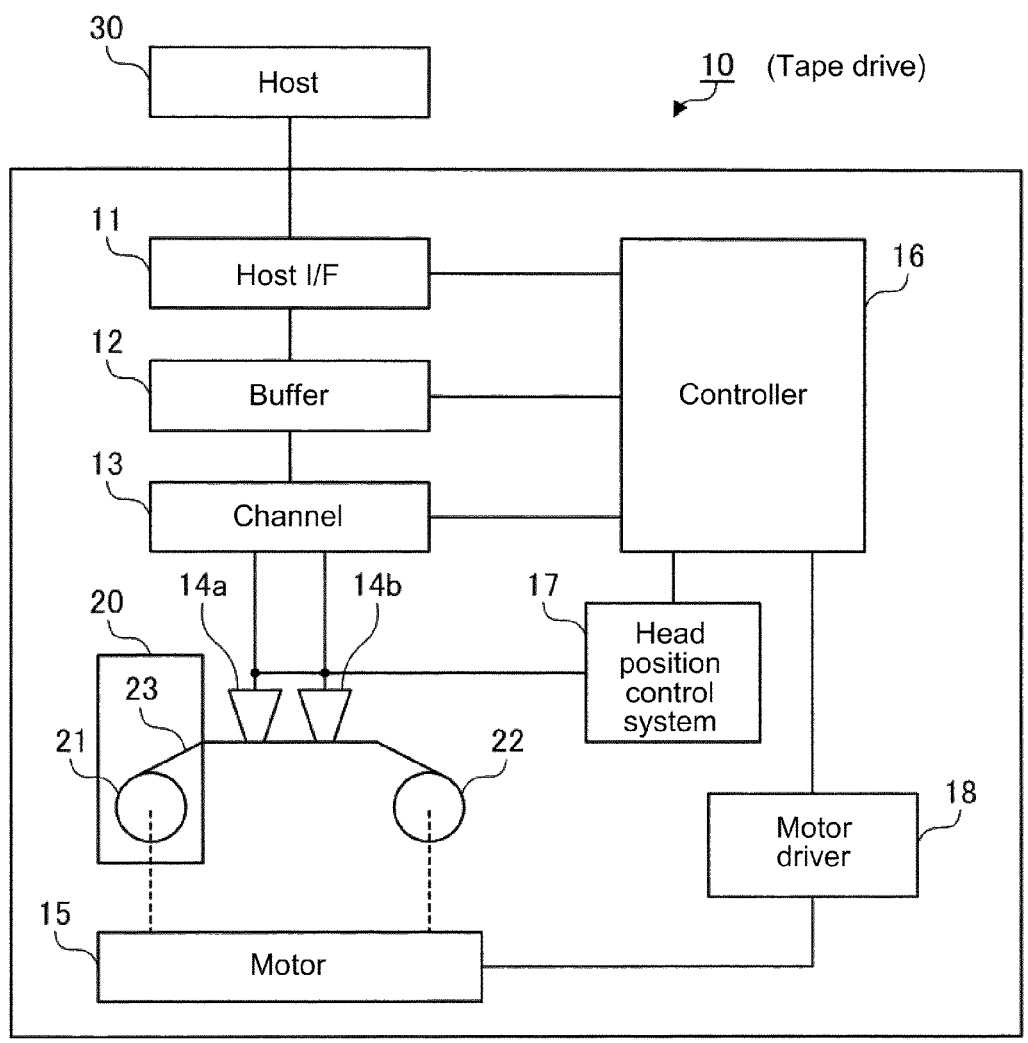
FIG. 1 is a block diagram showing a tape drive that may be used in accordance with an exemplary embodiment.

The various embodiments will be described below in detail with reference to the accompanying drawings. FIG. 1 is a diagram showing a tape drive 10 that may be used in accordance with an exemplary embodiment. The tape drive 10 comprises a host interface (i.e., host I/F) 11, a buffer 12, a channel 13, a write head 14a, a read head 14b, and a motor 15. Moreover, the tape drive comprises a controller 16, a head position control system 17, and a motor driver 18. Further, a tape cartridge 20 may be inserted into the tape drive 10. The tape cartridge 20 comprises a tape 23 that may be wound around reels 21 and 22. The tape 23 is moved in a longitudinal direction from the reel 21 to the reel 22, or from the reel 22 to the reel 21, along with the rotation of the reels 21 and 22. The tape 23 may be magnetic tape or another form of tape medium.

Herein, the host I/F 11 communicates with a host 30. The host 30 may be an upper level system. The host 30 receives a command for writing data on the tape 23, a command for moving the tape 23 to the intended position, and a command for reading data from the tape 23. Small Computer System Interface (SCSI) is exemplified as the set of communication standards for use in the host I/F 11, but other communication standards may be used as appropriate. In the case SCSI is used, a first command corresponds to a Write command, a second command corresponds to a Locate command or Space command, and a third command corresponds to a Read command. The host I/F 11 returns a response to the host 30 indicating whether a process according to one or more of these commands is successful.

The buffer 12 is a memory for accumulating data to be written on the tape 23 and data read from the tape 23. For example, the buffer may be a DRAM (Dynamic Random Access Memory). Also, the buffer 12 is composed of a plurality of buffer segments, each buffer segment storing a data set in a read unit or write unit for the tape 23. The channel 13 is a communication path used to send data to be written on the tape 23 to the write head 14a or to receive data read from the tape 23 from the read head 14b. The write head 14a writes information on the tape 23 when the tape 23 is moved in the longitudinal direction, and the read head 14b reads information from the tape 23 when the tape 23 is moved in the longitudinal direction. The motor 15 rotates the reels 21 and 22. In FIG. 1, a single motor 15 is depicted, but alternatively two or more motors 15 may be provided for the reels 21 and 22.

The controller 16 controls the entire tape drive 10 or portions thereof. For example, the controller 16 controls data writes to the tape 23 and data reads from the tape 23 in accordance with a command accepted by the host I/F 11. Also, the controller 16 controls the functionality of the head position control system 17 and the motor driver 18. The head position control system 17 controls the write head 14a and the read head 14b to track one or more wraps as desired. Herein, a wrap is a group of plural tracks on the tape 23. In the event of a wrap switch, the write head 14a and the read head 14b must be electrically switched, and the head position control system 17 controls such switching. The motor driver 18 drives the motor 15. In the event two or more motors 15 are used as mentioned above, two or more corresponding motor drivers 18 may be provided.

Figure 2:
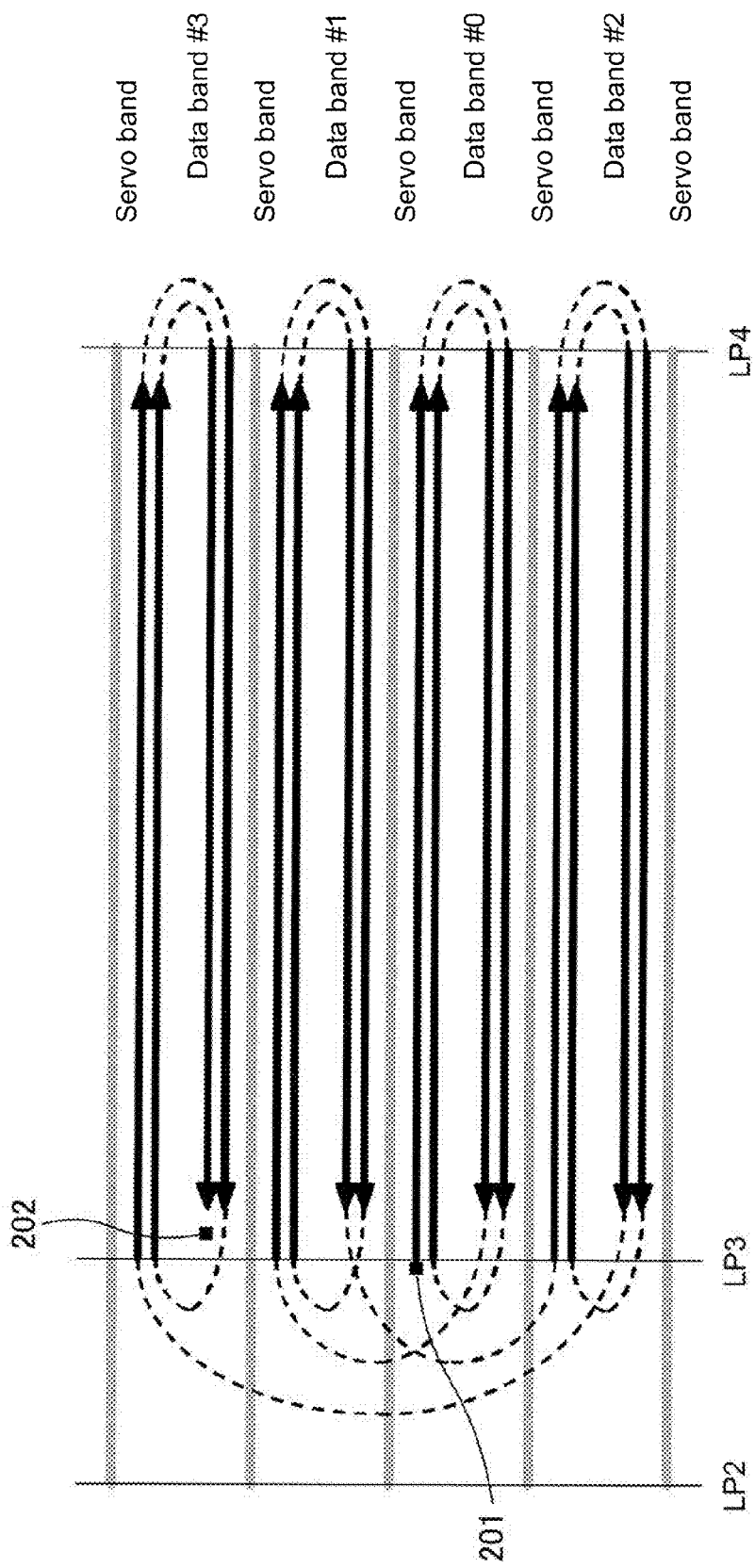
FIG. 2 shows the format of a tape that may be used in conjunction with the tape drive of FIG. 1.

An IBM enterprise tape drive TS1130 may be used as an example of the tape drive 10. The format of the tape 23 that may be used in with the TS1130 will now be described. FIG. 2 schematically illustrates the format of the tape 23. As shown in FIG. 2, a calibration area of the tape 23 is from LP2 to LP3, and a user data area is from LP3 to LP4. Five servo bands are provided on the tape 23. The servo band is an area where a servo pattern indicating the physical position on the tape 23 is written. The tape 23 is divided into four data bands by the five servo bands. The data band is an area into which user data is written. Each data band is provided with several tens of wraps. In FIG. 2, a solid-line arrow represents one wrap. Data is read or written in the forward direction with respect to a wrap as indicated by a right arrow and then is read or written in the reverse direction with respect to a wrap as indicated by a left arrow. While FIG. 2 shows two wraps in which data is read or written in the forward direction and two wraps in which data is read or written in the reverse direction within one data band, in actual application there are seven to nine wraps in each of the forward direction and the reverse direction. The wraps are arranged spirally within one data band. That is to say, data is read from or written on the tape 23 alternately in the forward direction and the reverse direction.

Furthermore, data reads from or data writes to the tape 23 are performed along the wraps arranged spirally within the data band #0, starting from a start position 201. Thereafter, proceeding sequentially through the data bands #1, #2 and #3, data reads or data writes are performed along the wraps arranged spirally within each data band, reaching an end position 202. Once the wraps in a currently used data band are traversed, processing transfers to the next data band.

It should be noted that FIG. 2 is only a conceptual drawing, and accordingly the relation of the various data bands to the write head 14a and the read head 14b is not explicitly shown in the drawing. The tape drive 10 comprises a plurality of write heads 14a and a plurality of read heads 14b. For example, a solid-line arrow in FIG. 2 corresponds to a track left when a write head 14a writes data to a wrap or a read head 14b reads data from a wrap. If a rightward arrow indicates a forward direction track corresponding to a first write head 14a and read head 14b, forward direction tracks corresponding to second, third, and subsequent write heads 14a and read heads 14b are sequentially disposed below such track. Similarly, if a leftward arrow indicates a reverse direction track corresponding to the first write head 14a and read head 14b, reverse direction tracks corresponding to second, third, and subsequent write heads 14a and read heads 14b are sequentially disposed below such track.

Furthermore, a volume of data including the nominal capacity of a wrap plus a margin of approximately 7% can be written on each wrap of the tape 23. Therefore, the nominal capacity of data generally can be written on a wrap, even if there are minor defects (e.g., physical scars) on such wrap.

The tape drive 10 is configured to use a relatively low amount of power and thus may be used in conjunction with environmentally friendly storage endeavors. However, since the tape drive 10 takes a significant amount of time to make an alignment necessary for writing or reading, within a system the tape drive 10 is combined with a hard disk drive (HDD) having high response speed.

In such system, from an application side standpoint, the format in which the tape drive 10 stores user data is irrelevant. However, the tape format is important with respect to the amount of user data stored on the tape 23. The IBM enterprise tape drive TS1130 can read user data in three different formats (first generation to third generation formats) from the tape 23 and can write user data in two different formats (second generation to third generation formats) on the tape 23. However, user data in multiple formats cannot be mixed on the tape 23.

A newer generation format has a higher line density (i.e., density in the horizontal direction with respect to the running direction of the tape 23) and a higher track density (i.e., density in the vertical direction with respect to the running direction of the tape 23) than an older generation format. This means, e.g., that the tape 23 can store more user data by writing in the third generation format as opposed to the first generation format. In sum, the tape 23 generally has increased capacity if written in a newer generation format.

FIG. 3 is a view showing read/write relationships between the IBM enterprise tape drive generations and the tape format generations. In FIG. 3, the numerical value within the parentheses after each tape format generation indicates the capacity of the tape 23 of each respective tape format generation. In each cell at which the "Read" column of a respective tape drive generation and the row of a respective tape format generation intersect, it is indicated whether the tape drive 10 of the respective generation can read data written in the respective tape format from the tape 23. "Y" indicates that such data can be read, and "N" indicates that such data cannot be read. Similarly, in each cell at which the "Write" column of a respective tape drive generation and the row of a respective tape format generation intersect, it is indicated whether the tape drive 10 of the respective generation can write data in the respective tape format on the tape 23. "Y" indicates that such data can be written, and "N" indicates that such data cannot be written.

To convert the format of the tape 23 without losing information written on the tape 23, the following procedure may be practiced:

(1) transfer all data from the tape 23 to the host 30;

(2) convert the format of the tape 23 to the desired format—i.e., format information described in a cartridge memory (CM) of non-volatile memory is changed; and (3) rewrite all data stored in the host 30 on the tape 23 in the converted format.

However, the aforementioned procedure requires the resources of at least one tape drive 10 and at least one host 30. Thus, if the host 30 is used for a format conversion, other processes of the host 30 may be adversely affected. Accordingly, an improved method would be advantageous in which the tape drive 10 singly converts data on the tape 23 formatted in a given generation into the format of another generation (usually a newer generation, but potentially an older generation in certain cases) without requiring the host 30.

An advantage of converting the tape format into a newer generation format is increased capacity, as described previously. On the other hand, an advantage of converting the tape format into an older generation format is increased compatibility in some cases. For example, converting the tape format into an older generation format may enable an older generation tape drive 10 to read data stored on the tape 23 that was previously in a newer generation format unreadable by the older generation tape drive 10.

In accordance with an exemplary embodiment, a method is provided in which the tape drive 10 singly converts the format of the tape 23 without losing user data already written on the tape 23. With this method, the format conversion can be made without using the resources of the host 30. As a result of a conversion to a newer generation tape format, the available capacity of the tape 23 is increased. For example, if the tape format is converted from the first generation format to the second generation format, as indicated in FIG. 3 the capacity of the tape 23 is increased from 300 GB to 500 GB. Also, even if a write error occurs during the format conversion, the existing data on the tape 23 is preserved.

Figure 4:
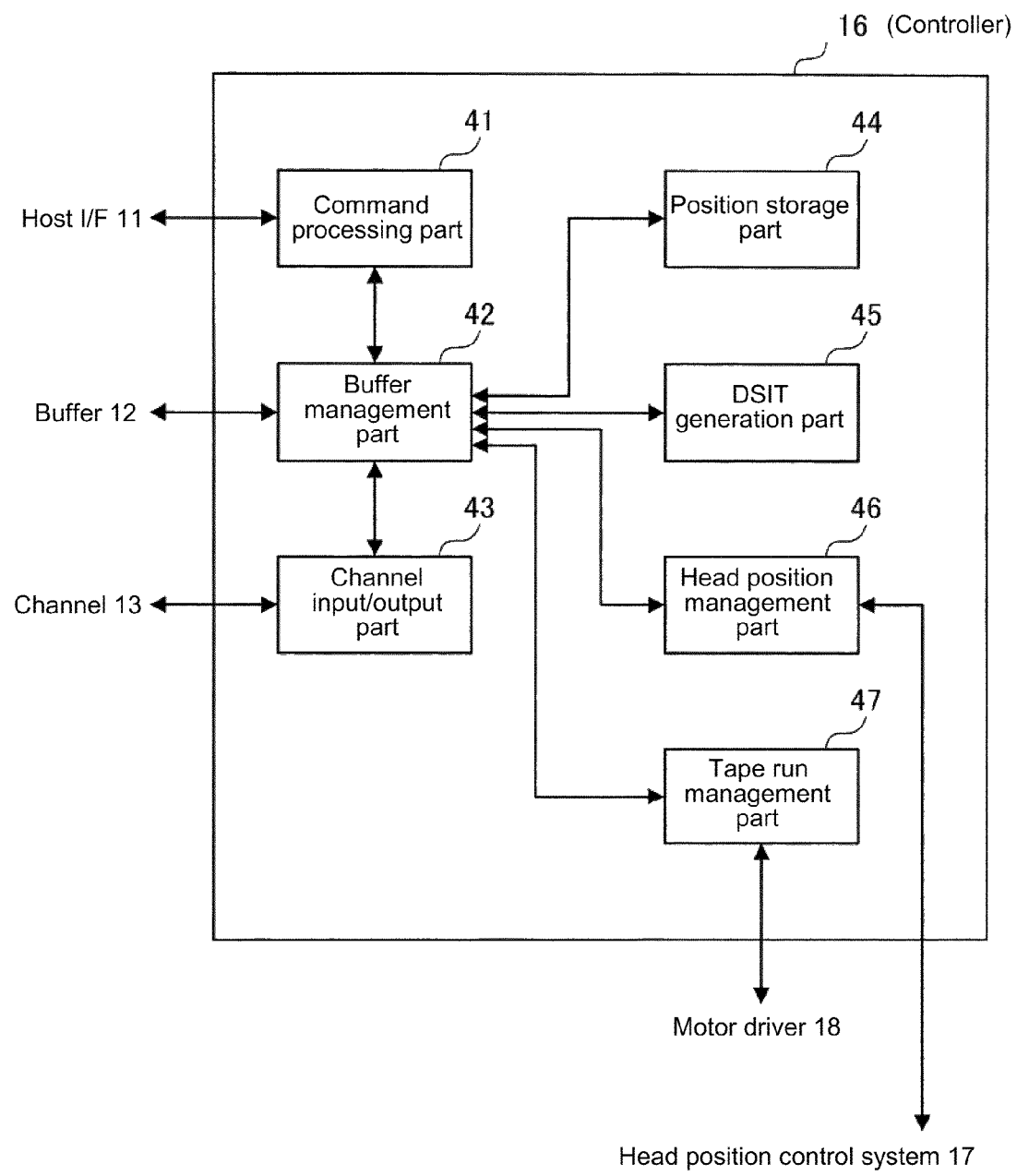
FIG. 4 is a block diagram showing a functional configuration of a tape drive controller in accordance with an exemplary embodiment.

A functional configuration of the controller 16 for performing a format conversion in accordance with the aforementioned method now will be described. FIG. 4 is a block diagram showing an exemplary functional configuration of the controller 16 in accordance with an exemplary embodiment. As shown in FIG. 4, the controller 16 comprises a command processing part 41, a buffer management part 42, a channel input/output part 43, a position storage part 44, a DSIT generation part 45, a head position management part 46, and a tape run management part 47.

The command processing part 41 receives a command from the host I/F 11. Herein, examples of such command include a Write command for storing data in the buffer 12, a Synchronization command for writing data stored in the buffer 12 on the tape 23, and a Read command for reading data from the tape 23. If the command processing part 41 receives the Write command, the buffer management part 42 prepares data in the buffer 12. Moreover, if the command processing part 41 receives the Synchronization command, the buffer management part 42 reads data from the buffer 12 and outputs the data to the channel input/output part 43. Furthermore, if the command processing part 41 receives the Read command, the buffer management part 42 instructs the channel input/output part 43 to read the data at issue if it does not exist in the buffer 12 or to return the data at issue to the host 30 via the command processing part 41 if it exists in the buffer 12.

The channel input/output part 43 outputs data read from the buffer 12 by the buffer management part 42 to the channel 13 or outputs the data received from the channel 13 to the buffer management part 42. Also, the channel input/output part 43 acquires information regarding the current position of the write head 14a and the read head 14b on the tape 23 in the longitudinal direction.

The position storage part 44 stores the write start position A and the read start position B on the tape 23. The DSIT generation part 45 generates a DSIT (data set information table) based on the write start position A and the read start position B stored in the position storage part 44, the data set number, and the write pass (WP). In accordance with the various embodiments described herein, specific data recorded in a first area in a first format on the tape 23 is read, is written in a second area, and subsequently is written in a second format in a third area. According to an exemplary embodiment, as described further herein, the read start position B stored by the position storage part 44 is used as specific information for specifying a read position of other data among data recorded in the first format on tape 23. According to another exemplary embodiment, as described further herein, the data set number and WP are used as first specific information for specifying a part among the specific data written in the second area corresponding to a part of the specific data written in the second format in the third area, and the read start position B stored by the position storage part 44 is used as second specific information for specifying a read position of the other data recorded in the first format on the tape 23. Additionally, in accordance with the various embodiments described herein, the DSIT generation part 45 is used as a recording part for recording the specific information, a recording part for recording the first specific information and the second specific information, and/or a generation part for generating the first specific information and the second specific information.

The head position management part 46 outputs a signal to the head position control system 17 for offsetting the position of the write head 14a and the read head 14b on the tape 23 in the width direction of the tape 23. Moreover, the head position management part 46 acquires information on the current position of the write head 14a and the read head 14b in the width direction of the tape 23. According to an exemplary embodiment, the head position management part 46 is used as a first control part for controlling the read head 14b such that the read head 14b reads the specific data recorded in the first area. Moreover, the head position management part 46 is used as a second control part for controlling the write head 14a such that the write head 14a writes the specific data into the second area and the third area. The tape run management part 47 outputs a signal to the motor driver 18 for running the tape 23 in the forward direction or a signal for running the tape 23 in the reverse direction.

Figure 5:
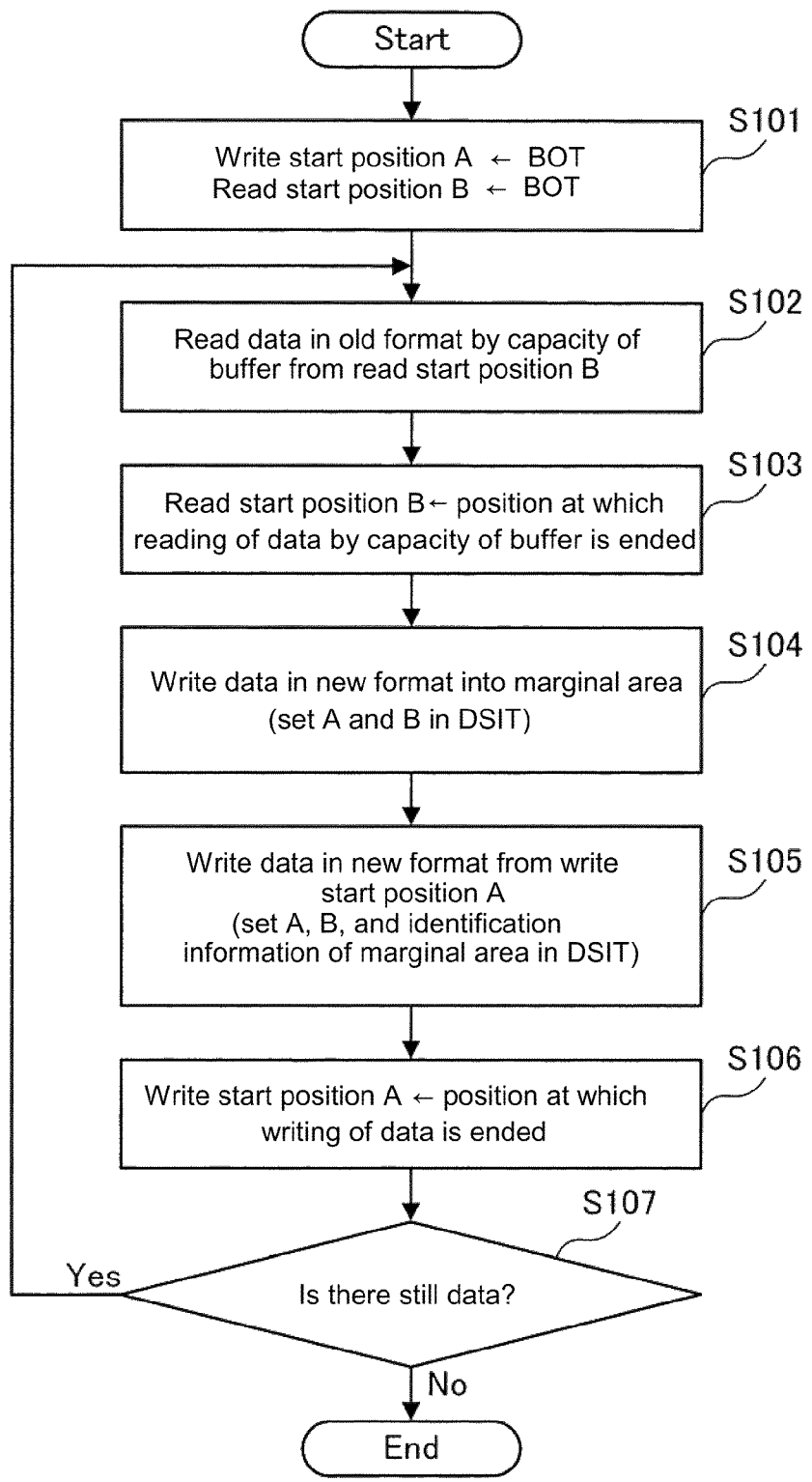
FIG. 5 is a flowchart showing exemplary operations of the tape drive controller at format conversion time in accordance with an exemplary embodiment.

The method for converting the format of user data written on the tape 23 from a first, older generation format (hereinafter referred to as "old format") to a second, newer generation format (hereinafter referred to as "new format") on the tape drive 10 singly without losing existing user data now will be described. FIG. 5 is a flowchart showing exemplary conversion operations of the controller 16 at format conversion time in accordance with an exemplary embodiment.

Initially, the buffer management part 42 stores a BOT (Beginning Of Tape) indicator. Specifically, the buffer management part 42 stores in the position storage part 44 the top position of the data band #0 as the write start position A and the read start position B (step S101). Then, the buffer management part 42 reads user data written in the old format from the read start position B currently stored in the position storage part 44 up to the amount storable in the buffer 12 and stores the read data in the buffer 12 (step S102). More specifically, the buffer management part 42 instructs the head position management part 46 to output a signal to the head position control system 17 for positioning the read head 14b in the wrap including the read start position B, and instructs the tape run management part 47 to output a signal to the motor driver 18 for running the tape 23 at reading speed. Also, the buffer management part 42 receives a data set read by the channel input/output part 43 via the read head 14b and stores the data set in the buffer 12. The capacity of the buffer 12 is about 512 MB to 1 GB. The area from the read start position B to the read position at which the buffer 12 becomes full is an example of the aforementioned first area. Subsequently, the buffer management part 42 stores the read position at which the buffer 12 becomes full while reading data at step S102 as the new read start position B in the position storage part 44 (step S103).

Then, the buffer management part 42 changes the write format setting to the new format and writes the user data read at step S102 and stored in the buffer 12 in the new format into a marginal area of the tape 23 (step S104). More specifically, the buffer management part 42 instructs the head position management part 46 to output a signal to the head position control system 17 for positioning the write head 14a in the wrap including the marginal area, and instructs the tape run management part 47 to output a signal to the motor driver 18 for running the tape 23 at writing speed. Also, the buffer management part 42 extracts the data set from the buffer 12 for transfer to the channel input/output part 43 and instructs the channel input/output part 43 to write the data set on the tape 23 via the write head 14a. At such time, using the DSIT generation part 45, the buffer management part 42 writes the write start position A and the read start position B read from the position storage part 44 into a DSIT associated with the data set. Such DSIT also may be written in the marginal area. The marginal area is an example of the aforementioned second area.

Subsequently, the buffer management part 42 writes the user data read at step S102 and stored in the buffer 12 in the new format from the write start position A (step S105). That is to say, the user data is rewritten in the new format, starting at the write start position A. More specifically, the buffer management part 42 instructs the head position management part 46 to output a signal to the head position control system 17 for positioning the write head 14a in the wrap including the write start position A, and instructs the tape run management part 47 to output a signal to the motor driver 18 for running the tape 23 at writing speed. Also, the buffer management part 42 extracts the data set from the buffer 12 for transfer to the channel input/output part 43 and instructs the channel input/output part 43 to write the data set on the tape 23 via the write head 14a. At such time, the DSIT generation part 45 writes information for specifying the same data set written in the marginal area in step S104 into the DSIT of the data set written from the write start position A. Herein, the information for specifying the data set includes a combination of the data set number and the WP for distinguishing the same data set number. Also, the DSIT includes the write start position A and the read start position B read from the position storage part 44. The area where data is written in the new format from the write start position A is one example of the aforementioned third area. Subsequently, the buffer management part 42 stores the position at which the writing in step S105 ends as the new write start position A in the position storage part 44 (step S106).

Thereafter, the buffer management part 42 determines whether there is still user data to be processed (step S107). If it is determined that there is no more user data to be processed, the process ends (End step). Conversely, if it is determined that there is still user data to be processed, the process returns to step S102. Accordingly, the process from step S102 to step S106 is repeated until conversion of all user data is completed.

If user data is converted from the old format to the new format in accordance with the above process, it is assured that the user data written in the new format does not overwrite the user data written in the old format that has not yet been read, since between these formats there are differences in terms of line density and track density.

As described above, the conversion process from step S102 to step S106 is performed with user data amounting to the capacity of the buffer 12 as a unit. However, after a large amount of data exceeding the capacity of the buffer 12 is copied to the marginal area by repeating the process from step S102 to step S104, data may be written in the new format by performing the process of steps S105 and S106. That is to say, the volume of data written in the marginal area may be decided based on the capacity of the buffer 12 or the volume of data writable in the marginal area.

The various embodiments described herein address error cases that may arise during format conversion. Herein, the following error cases are considered:
  (a) Case in which an error occurs at step S102. In this error case, an error occurs when reading data recorded on the tape 23. One series of processes may be interrupted.
  (b) Case in which an error occurs at step S104. In this error case, an error occurs when writing data read from the tape 23 into the marginal area.
  (c) Case in which an error occurs at step S105. In this error case, an error occurs when rewriting data once written into the marginal area from the write start position A.

In accordance with the various embodiments described herein, all user data can be properly read even after an occurrence of one or more of the above error cases.

Figure 6:
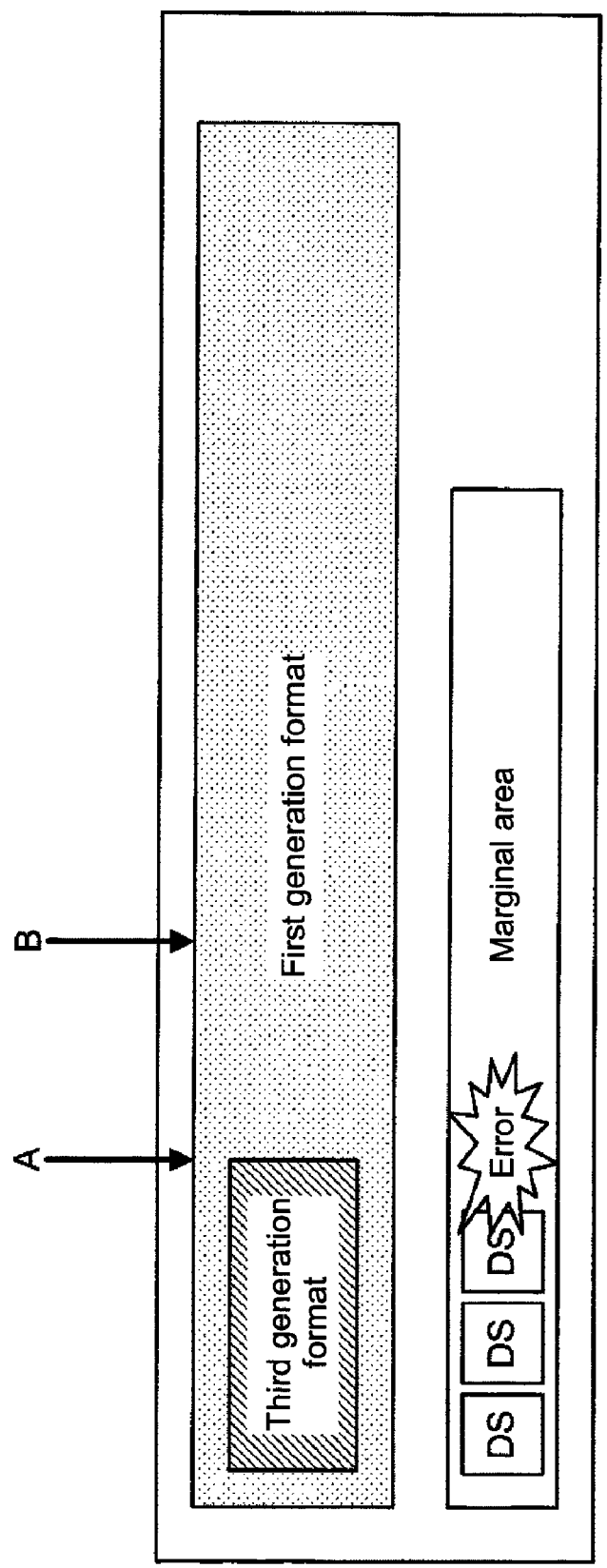
FIG. 6 illustrates how error cases (a) and (b) are addressed at data read time in accordance with an exemplary embodiment.

FIG. 6 illustrates how error cases (a) and (b) are addressed at data read time in accordance with an exemplary embodiment. Herein, it is assumed that the old format is the first generation format, the new format is the third generation format, and "DS" denotes a data set. In the error cases (a) and (b), specific data originally recorded in the first generation format in an area indicated by dotted shading is successfully converted to the third generation format and rewritten in an area indicated by slanted shading (i.e., rewrite area), but an error occurs when reading other data (error case (a)) or when writing other data into the marginal area (error case (b)). The other data that could not be successfully read (error case (a)) or that could not be successfully written into the marginal area (error case (b)) remains unchanged in the dotted shaded area. In such case, the other data affected by error case (a) or error case (b) is read from the dotted shaded area. Specifically, in accordance with the exemplary embodiment, the point at which the affected data starts within the dotted shaded area is determined by consulting specific information, namely the read start position B included in the DSIT of the last data set successfully rewritten in the third generation format in the rewrite area. Since the read start position B is included in the DSIT, in accordance with an exemplary embodiment, after the data rewritten in the third generation format is read from the BOT position to a point A in FIG. 6 (indicating the end of the data rewritten in the third generation format), a read operation that has been disrupted due to occurrence of error case (a) or error case (b) proceeds to a point B in FIG. 6 based on the read start position B indicated in the DSIT of the last data set that was successfully rewritten. Subsequently, the read format setting of the tape drive 10 is converted to the first generation format, and any following data sets are read.

Figure 7:
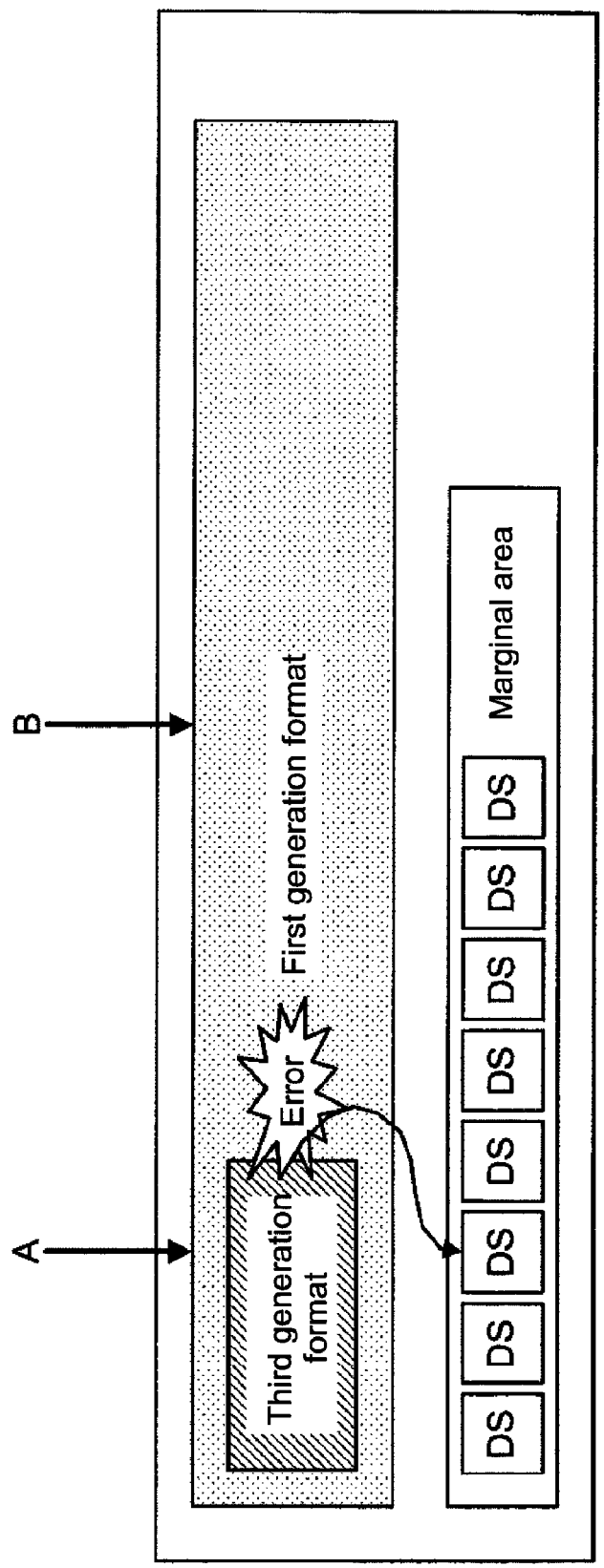
FIG. 7 illustrates how error case (c) is addressed at data read time in accordance with an exemplary embodiment.

FIG. 7 illustrates how error case (c) is addressed at data read time in accordance with an exemplary embodiment. Herein, as with FIG. 6, it is assumed that the old format is the first generation format, the new format is the third generation format, and "DS" denotes a data set. In the error case (c), specific data originally recorded in the first generation format in an area indicated by dotted shading is converted to the third generation format and rewritten in an area indicated by slanted shading (i.e., rewrite area), but an error occurs during the process of rewriting part of the specific data in the third generation format in the rewrite area. In such case, the part of specific data affected by error case (c) is read from the marginal area. Specifically, in accordance with the exemplary embodiment, the location of a data set in the marginal area corresponding to the part of the specific data affected by error case (c) is determined by consulting first specific information located in the DSIT of the data set rewritten immediately before a write error occurs among the data sets in the rewrite area. That is to say, since the data set number and WP are included in the DSIT, after the data set successfully rewritten in the third generation format immediately before the error occurs is read (the end of the last successfully rewritten data set being indicated in FIG. 7 by a point A), a read operation that has been disrupted due to occurrence of error case (c) proceeds to the marginal area in order to read the unsuccessfully rewritten data. The data set in the marginal area corresponding to the unsuccessfully rewritten part of the specific data is identified in the marginal area via the DSIT of the last successfully rewritten data set. Once the corresponding data set has been read in the marginal area, any additional data sets in the marginal area are read. Subsequently, it is determined whether there are remaining data sets to be read (i.e., it is determined whether there is other data yet to be read in the dotted shaded area). If it is determined that there are any remaining data sets, the read operation proceeds to a point B in FIG. 7 in order to read the remaining data sets. Point B is determined by consulting second specific information, namely the read start position B provided in the DSIT of the last data set in the marginal area.

Figure 8:
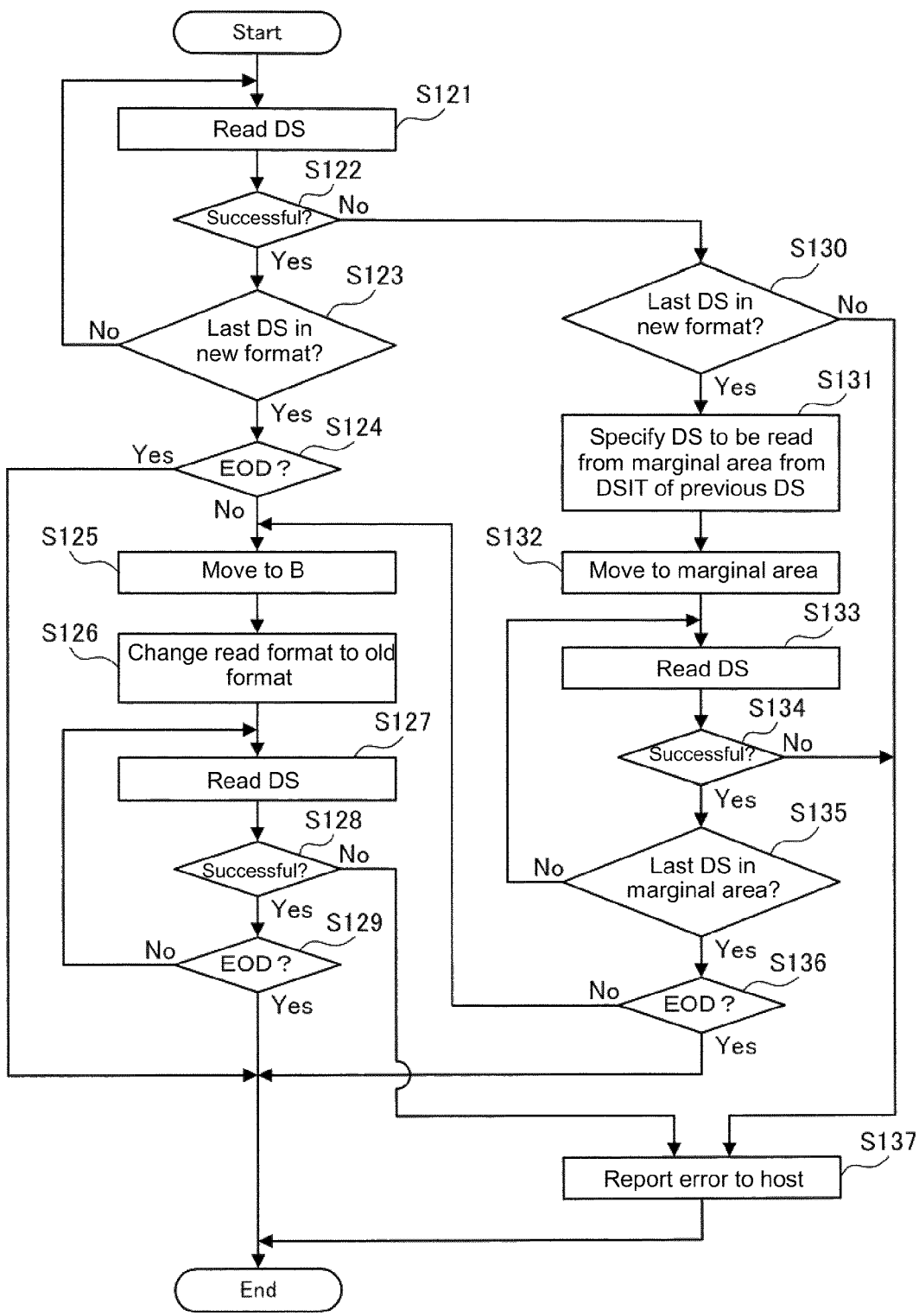
FIG. 8 is a flowchart showing exemplary operations of the tape drive controller at data read time in accordance with an exemplary embodiment.

Next, in accordance with the various embodiments, a process will be described that addresses the aforementioned error cases. FIG. 8 is a flowchart showing exemplary operations of the controller 16 at data read time in accordance with an exemplary embodiment. "DS" denotes a data set being processed in FIG. 8. First, the buffer management part 42 reads a data set recorded in the new format on the tape 23 (step S121). More specifically, the buffer management part 42 instructs the head position management part 46 to output a signal to the head position control system 17 for positioning the read head 14b in the wrap including the read position, and instructs the tape run management part 47 to output a signal to the motor driver 18 for running the tape 23 at reading speed. Also, the buffer management part 42 receives a data set read by the channel input/output part 43 via the read head 14b and stores it in the buffer 12.

Then, the buffer management part 42 determines whether the reading is successful (step S122). If it is determined that the reading is successful, the buffer management part 42 determines whether the read data set is the last data set recorded in the new format in the rewrite area (step S123). If the read data set is not the last data set recorded in the new format in the rewrite area, the operation returns to step S121. If the read data set is the last data set recorded in the new format in the rewrite area, it is determined whether the read data set is the end of data (EOD) (step S124). If the read data set is EOD, then the process ends (End step), as all data has been properly read. If the read data set is not EOD, the process proceeds in order to address one of error cases (a) and (b). To address one of these error cases, the buffer management part 42 shifts the read position to the read start position B included in the DSIT of the read data set (step S125). More specifically, the buffer management part 42 instructs the head position management part 46 to output a signal to the head position control system 17 for positioning the read head 14b in the wrap including the read start position B, and instructs the tape run management part 47 to output a signal to the motor driver 18 for running the tape 23 to the read start position B at maximum speed.

Subsequently, the buffer management part 42 changes the read format setting to the old format (step S126). Then, the buffer management part 42 reads data recorded in the old format from the read start position B (step S127). More specifically, the buffer management part 42 instructs the tape run management part 47 to output a signal to the motor driver 18 for running the tape 23 at reading speed. Moreover, the buffer management part 42 receives the data set read by the channel input/output part 43 via the read head 14b and stores the data set in the buffer 12. Thereafter, the buffer management part 42 determines whether the reading is successful (step S128). If it is determined that the reading is successful, the buffer management part 42 determines whether the read data set is EOD (step S129). If the read data set is not EOD, the process returns to step S127. If the read data set is EOD, the process ends (End step), as all data has been properly read. If in step S128 it is determined that the reading is unsuccessful, the buffer management part 42 reports an error to the host 30 (step S137). More specifically, the buffer management part 42 instructs the command processing part 41 to report an error to the host 30.

Conversely, if in step S122 it is determined that the reading is unsuccessful, the buffer management part 42 determines whether the unread data set is the last data set recorded in the new format in the rewrite area (step S130). If the unread data set is not the last data set recorded in the new format in the rewrite area, the buffer management part 42 reports an error to the host 30 (step S137). More specifically, the buffer management part 42 instructs the command processing part 41 to report the error to the host 30. If the unread data set is the last data set recorded in the new format in the rewrite area, the process proceeds in order to address the error case (c). To address this error case, the buffer management part 42 specifies the data set to be read from the marginal area based on the DSIT of the data set read immediately before (step S131). Since the DSIT includes data set information including the data set number and WP, the data set to be read from the marginal area is specified from this information. Then, the read position is shifted to the position of the specified data set in the marginal area (step S132). More specifically, the buffer management part 42 instructs the head position management part 46 to output a signal to the head position control system 17 for positioning the read head 14b in the wrap including the specified position, and instructs the tape run management part 47 to output a signal to the motor driver 18 for running the tape 23 to the specified position at maximum speed.

Subsequently, the buffer management part 42 reads the specified data set from the marginal area (step S133). More specifically, the buffer management part 42 instructs the tape run management part 47 to output a signal to the motor driver 18 for running the tape 23 at reading speed. Also, the buffer management part 42 receives the data set read by the channel input/output part 43 via the read head 14b and stores the data set in the buffer 12. Then, the buffer management part 42 determines whether the reading is successful (step S134). If it is determined that the reading is unsuccessful, the buffer management part 42 reports an error to the host 30 (step S137). More specifically, the buffer management part 42 instructs the command processing part 41 to report the error to the host 30. On the other hand, if it is determined that the reading is successful, the buffer management part 42 determines whether the read data set is the last data set in the marginal area (step S135). If the read data set is not the last data set in the marginal area, the process returns to step S133. If the read data set is the last data set in the marginal area, it is determined whether the read data set is EOD (step S136). If the read data set is EOD, the process ends (End step), as all data has been properly read. If the read data set is not EOD, the process proceeds to step S125.

Regarding a technique for determining whether the read data set is the last data set recorded in the new format in the rewrite area (steps S123 and S130 above), the following methods may be considered:

(1) The data set number of the last data set rewritten in the new format may be recorded in the CM.

(2) When data is read with the read format setting set to the new format, read data is recognized as noise if such data is data in the old format. Accordingly, the last data set in the new format may be determined by analyzing the presence of noise.

(3) When the data set corresponding to the last data set in the marginal area is written in the new format, an incremented WP and data set number may be written into the DSIT. Accordingly, the last data set written in the new format may be determined by finding the last data set with the incremented WP. Also, even when an error occurs in reading the previous data set, the data set number and WP that should be used to search the marginal area may be indicated.

By combining these methods when an issue arises (e.g., when the CM is broken or when the read head 14b suddenly malfunctions), the last data set can be detected at high precision.

According to an exemplary embodiment, the write start position A, the read start position B, the data set number, and the WP of the data set in the marginal area are written into the DSIT. According to another exemplary embodiment, this information may be stored in the CM. As mentioned above, the write start position A also is included in the DSIT in addition to the read start position B. While the write start position A is not necessary for the purpose of changing the data format without data loss, it may be useful to include this position in the DSIT for the purpose of detecting or addressing a problem that may arise as a result of writing from an erroneous write start position (e.g., in the context of step S105 described above).

Moreover, according to an exemplary embodiment, the data set number and WP of the data set are not written into the DSIT of a data set to be written in the marginal area. However, the data set number and WP of the top data set in the data set group written in the old format corresponding to each data set to be written in the marginal area may be held. Accordingly, when a read error is encountered in reading data from the marginal area in the error case (c), it is possible to recover from such error by reading the affected data set in the old format.

Furthermore, according to an exemplary embodiment, the marginal area may be used for the purpose of error recovery with respect to writing data. However, even in such case, a part of the marginal area is reserved for format conversion so that the various embodiments described herein may be realized.

Though data may be written in the marginal area in a newer generation format as described above in accordance with the various embodiments, alternatively data may be written in the marginal area in the older generation format or in another format. Thus, in accordance with the various embodiments described herein, user data written in a certain format may be once copied to the marginal area of the tape 23 and then rewritten in another format. Furthermore, although format conversion from an older generation format to a newer generation format is described herein with respect to FIGS. 5-8, the various embodiments may be applicable to format conversion from a newer generation format to an older generation format or format conversion between two formats without distinction of new and old. Accordingly, the various embodiments contemplate a diverse range of possibilities with respect to format conversion of user data without data loss.

The various operations described herein may be used not only for format conversion but also for defragmentation of the tape 23 via a virtual tape server (VTS).

The various embodiments described herein may be implemented via hardware, via software, or via a combination thereof. The various embodiments may be realized as a computer, a data processing system, and a computer program. Such computer program may be stored in a computer-readable medium. Such computer-readable medium may be an electronic, magnetic, optical, electromagnetic, infrared, or semiconductor system (device or apparatus), or a transmission medium. Examples of such computer-readable medium may include a semiconductor, a solid state storage device, a magnetic tape, a removable computer diskette, a random access memory (RAM), a read-only memory (ROM), a rigid magnetic disk, and an optical disk. The examples of the optical disk at the present time may include a compact disc read-only memory (CD-ROM), a compact disc read/write (CD-R/W) a DVD, and a Blu-ray Disc (BD).

Though the various embodiments have been described above via exemplary embodiments, the technical range of the various embodiments is not limited in scope to such exemplary embodiments. It is apparent to those skilled in the art that the invention may be varied or modified in various ways without departing from the spirit or scope of the various embodiments.

What is claimed is:

1. A device for processing data recorded on a tape medium, said device comprising:
a first control part for controlling a read head to read specific data recorded in a first area among data recorded in a first format on said tape medium, wherein data in said first format is recorded at a first recording density; and
a second control part for controlling a write head to write said specific data in a second area of said tape medium different from said first area of said tape medium and to write said specific data in a second format in a third area different from said second area of said tape medium, wherein data in said second format is recorded at a second recording density different from said first recording density.

2. The device according to claim 1, further comprising a recording part for recording specific information that specifies a read position of other data among data recorded in said first area in said first format on said tape medium.

3. The device according to claim 2, wherein said first control part controls said read head to read said specific data written in said second format in said third area and to read said other data from said read position specified by said specific information.

4. The device according to claim 2, wherein said recording part records said specific information together with said specific data in said third area.

5. The device according to claim 1, further comprising a recording part for recording first specific information that specifies a part among said specific data written in said second area corresponding to a part of said specific data written in said second format in said third area, and records second specific information that specifies a read position of other data among data recorded in said first format on said tape medium.

6. The device according to claim 5, wherein said first control part controls said read head to read a first part of said specific data written in said second format in said third area and to read a part among said specific data written in said second area that corresponds to a second part adjacent to said first part and that is specified by said first specific information.

7. The device according to claim 6, wherein said first control part controls said read head to read said other data from said read position specified by said second specific information.

8. The device according to claim 1, wherein said first control part determines a volume of said specific data based on a capacity of a buffer for accumulating data that said read head reads.

9. The device according to claim 1, wherein said first control part determines a volume of said specific data based on a volume of data that can be written in said second area.

10. The device according to claim 1, wherein said second control part controls said write head to write said specific data in said third area after writing said specific data in said second area.

11. A device for processing data recorded on a tape medium, said device comprising:
 a first control part for controlling a read head to read specific data recorded in a first area among data recorded in a first format on said tape medium;
 a generation part for generating first specific information that specifies a part among said specific data written in a second area different from said first area corresponding to a part of said specific data written in a second format in a third area different from said second area, and second specific information for specifying a read position of other data among data recorded in said first format on said tape medium; and
 a second control part for controlling a write head to write said specific data and said first specific information in said second area of said tape medium and to write said specific data, said first specific information, and said second specific information in said second format in said third area of said tape medium.

12. A method for processing data recorded on a tape medium, said method comprising:
 reading specific data recorded in a first area among data recorded in a first format on said tape medium, wherein data in said first format is recorded at a first recording density;
 writing said specific data in a second area of said tape medium different from said first area of said tape medium; and
 writing said specific data in a second format in a third area different from said second area of said tape medium, wherein data in said second format is recorded at a second recording density different from said first recording density.

13. The method according to claim 12, further comprising recording specific information that specifies a read position of other data among data recorded in said first area in said first format on said tape medium.

14. The method according to claim 13, further comprising:
 reading said specific data written in said second format in said third area; and
 reading said other data from said read position specified by said specific information.

15. The method according to claim 13, further comprising recording said specific information together with said specific data in said third area.

16. The method according to claim 12, further comprising:
 recording first specific information that specifies a part among said specific data written in said second area corresponding to a part of said specific data written in said second format in said third area; and
 recording second specific information that specifies a read position of other data among data recorded in said first format on said tape medium.

17. The method according to claim 16, further comprising:
 reading a first part of said specific data written in said second format in said third area; and
 reading a part among said specific data written in said second area that corresponds to a second part adjacent to said first part and that is specified by said first specific information.

18. The method according to claim 17, further comprising reading said other data from said read position specified by said second specific information.

19. The method according to claim 12, further comprising determining a volume of said specific data based on a capacity of a buffer for accumulating data that said read head reads.

20. The method according to claim 12, further comprising determining a volume of said specific data based on a volume of data that can be written in said second area.

21. The method according to claim 12, further comprising writing said specific data in said third area after writing said specific data in said second area.

* * * * *